United States Patent [19]

Storm

[11] Patent Number: 4,639,869
[45] Date of Patent: Jan. 27, 1987

[54] METHOD OF PROVIDING VARIABLE REDUCTION AXLE

[75] Inventor: Eric L. Storm, Troy, Mich.
[73] Assignee: Eaton Corporation, Cleveland, Ohio
[21] Appl. No.: 652,247
[22] Filed: Sep. 20, 1984
[51] Int. Cl.$^4$ .............................................. B60K 17/16
[52] U.S. Cl. ..................................... 364/424.1; 74/457
[58] Field of Search ............... 364/424.1; 74/417, 423, 74/457, 459.5; 29/159.2

[56] References Cited

U.S. PATENT DOCUMENTS 2,241,606 5/1941 Kysor ..................................... 74/424
3,572,154 3/1971 Bartolomucci ....................... 74/417

OTHER PUBLICATIONS

"Machinery Handbook" Twentieth Edition, pp. 870–875.

Primary Examiner—Gary Chin
Attorney, Agent, or Firm—D. A. Rowe; A. E. Chrow

[57] ABSTRACT

Disclosed is a method of providing different gear reduction ratios between a pinion gear (4) and ring gear (8) of a vehicular axle transmission (40) by application of trigonometric formulae heretofore thought unsuitable for such purpose.

2 Claims, 2 Drawing Figures

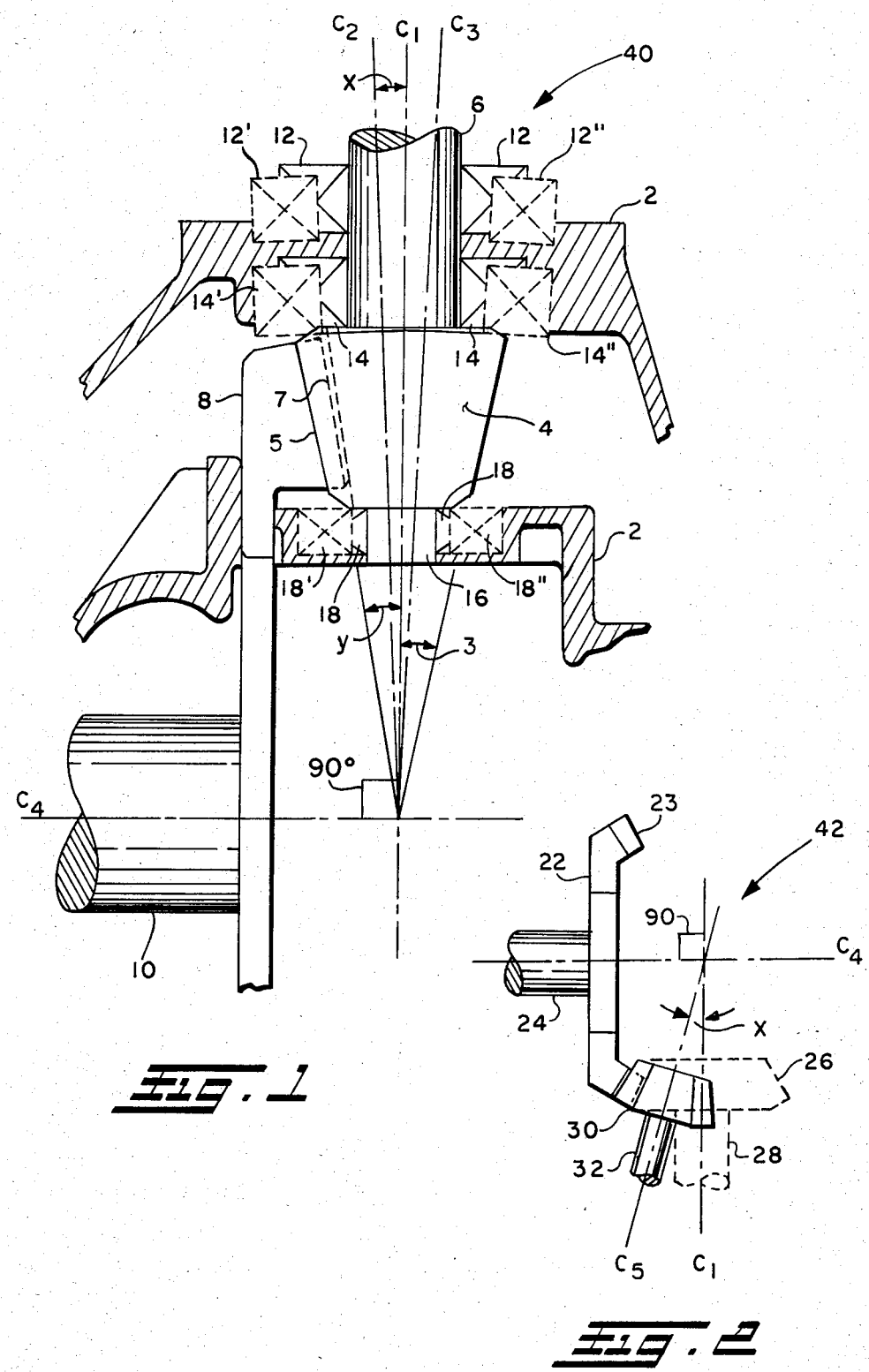

METHOD OF PROVIDING VARIABLE REDUCTION AXLE

This invention relates generally to motor vehicle axle differential design and more particularly to a method of changing the gear reduction ratio of a motor vehicle axle differential without having to change both the ring gear and the pinion gear which heretofore has been the practice in the past.

DESCRIPTION OF THE PRIOR ART

Axle differentials have been used for many years to transmit rotary action of the motor drive shaft to the back (and sometimes front) wheel of motor vehicles. In most modern day axle differentials, opposed wheel shafts are separate from each other and individually rotated by differential ring gears secured to each where only one of the differential ring gears is attached directly to a spiral or hypoid ring gear which is rotated by a pinion gear which is rotated by the motor drive shaft which in turn rotates the other differential ring gear by means of a planetary gear or other arrangement engaging both differential ring gears.

Motor vehicles have historically been provided with a differential housing with two differential ring gears that rotate the wheels and are mounted on a rotatable shaft fixedly positioned at 90° from the motor drive shaft of which one has teeth that engage teeth of a pinion gear mounted on a shaft that is generally axially aligned with the motor drive shaft. Rotation of the drive shaft causes the ring gear to rotate which in turn causes the wheel shafts to rotate. Examples of two such differential assemblies can be found in U.S. Pat. Nos. 2,241,606 and 3,572,154, the disclosures of which are incorporated hereby by reference. As previously described, both disclosures disclose the long established 90° relationship between the ring gear and pinion gear shafts of a motor vehicle axle differential.

Reduction ratios are estabished by the ratio of teeth between the ring and pinion gears the former of which is generally substantially larger in diameter than the pinion gear often having two or more times the teeth of the pinion gear.

Heretofore, in order to change the gear reduction ratio between a pinion gear mounted on a shaft positioned at 90° from the ring gear shaft, it has been standard and costly practice to change both the number of teeth on the pinion gear and the shape of the ring gear teeth to provide the desired tooth ratio between the two which is a costly and time consuming process.

Although it has been further known that variable gear ratios between spiral bevel gears could be obtained by changing only one of the gears and adjusting the angularity of the two shafts according to the Gleason System formulae for angular related spiral bevel gears disclosed on pages 870–872 of "Machinery Handbook", Twentieth Edition, the disclosure clearly states on page 871 what was thought to be the case prior to the present invention that the Gleason angular spiral bevel gears formulae do not apply to automotive axle drives.

Contrary to the assumption of non-applicability proferred by Gleason, it has been discovered that the angular spiral gear Gleason formulae can be effectively applied to adjust gear reductions of a motor vehicle axle by only having to change only one of the ring gear and pinion gear, preferably the pinion gear, and the angular relationship of its shaft to the ring gear shaft resulting in substantial savings by not having to change both the ring gear and the pinion gear and their respective mountings within the motor vehicle differential.

SUMMARY OF THE INVENTION

Accordingly, it is an object of this invention to provide a method of changing the gear reduction ratio of a motor vehicle axle differential.

It is another object of this invention to provide a method of changing the gear reduction ratio of a motor vehicle axle differential without having to change both the ring gear and the pinion gear and their respective mountings within the axle differential.

It is a further object of this invention to provide a motor vehicle axle that has been provided with a changed differential gear reduction ratio without having to change or reposition the ring gear mounted within the axle differential.

BRIEF DESCRIPTION OF THE DRAWINGS

FIG. 1 shows a partial cut away plan view of an axle differential provided with three alternate gear reduction ratios derived from the method of the invention; and FIG. 2 shows a schematic plan view of two positions of a pinion gear with respect to a ring gear providing different gear reduction ratios according to the method of the invention.

DESCRIPTION OF PREFERRED EMBODIMENTS

FIG. 1 shoes an embodiment of an axle differential 40 having a housing 2 surrounding cavity 3 in which are disposed pinion gear 4 and ring gear 8. Pinion gear 4 is secured to shaft 6 which, not shown, is suitably coupled to the drive shaft of a motor vehicle.

Pinion gear 4 is provided with a plurality of teeth 5 that are adapted to engage teeth 7 of ring gear 8. Ring gear 8 is secured to shaft 10 which is operatively secured to one of the vehicle wheels. For purposes of illustration, the number of teeth on the pinion gear is represented by "n" and the number of teeth on the ring gear is represented by "N". The reduction ratio of differential 40 is defined as n/N.

Shaft 6 has a central rotational axis $c_1$ that is 90° from rotational axes $c_4$ of shaft 10. Shaft 6 exits through an opening through housing 2 and is rotatably supported by means of bearings 12, 14 and 18 of which the latter engage an extension 16 of pinion gear 4. The 90° position between shaft 6 and shaft 10 is the conventional position assumed between the shafts of a differential ring gear and pinion gear.

Application of the Gleason formulae as hereinafter described for a particular example enables one to only have to change the number of teeth on the pinion gear and change the central rotational axis of the pinion gear shaft as for example to axis $c_2$ or $c_3$ to achieve two additional gear ratios. In adjusting the central rotational axis of the pinion gear, it is necessary to change the bearing mountings to the dashed position shown in FIG. 1 such that for axis $c_2$, bearings 12, 14 and 18 move to the viewer's left to dashed position 12', 14' and 18' respectively and for axis $c_3$ bearings 12, 14 and 18 move to the viewer's right to dashed positions 12", 14" and 18" respectively. Housing 2 can be suitably seated beforehand to accomodate a range of calculated bearing positions to suitably support shaft 6 in the $c_1$, $c_2$ and $c_3$ positions shown.

Understandably, it is necessary to adjust the pitch angle 3 of pinion gear 4 when changing its positional relationship with respect to pitch y of ring gear 8 to insure the optimum contacting relationship between the teeth of the two gears.

FIG. 2 shows a schematic diagram for illustrative purposes of an embodiment 42 of an axle differential (housing not shown) in which ring gear 22 having teeth 23 and shaft 24 coaxially aligned along central rotational axis $c_4$ which was originally at 90° to central rotational axis $c_1$ of shaft 28 of pinion gear 26 for a given gear reduction which was then changed to pinion gear 30 having a different number of teeth and a shaft 32 that is angularly disposed from axis $c_1$ by angle x to provide a different gear ratio without having to change ring gear 22. FIG. 2 clearly shows that the pitch of pinion gear 26 must accordingly be adjusted to match the pitch of ring gear 22 so that the teeth of both gears intermesh in an optimum manner.

By way of illustration only, the following Gleason formulae are applied to provide a method for determining the angular relationship between the ring gear shaft and the pinion gear shaft as a function of the particular gear reduction ratio desired.

It is first necessary to determine the number N teeth desired for the ring gear which is then fixed at the number chosen as for example 43 in following Table I.

It is then necessary to determine the lowest number n and highest number n of teeth desired for the pinion gear to provide a range of pinion gears.

Having determined the above, it is then necessary to calculate the median number n of pinion gear teeth in the range and consider the angle between the ring gear and pinion gear shafts to be 90° for the median ring gear teeth n determined.

Having determined the above, it is then necessary to calculate the pitch angle A of the median pinion gear where the angle between their respective shafts is 90° from the equation:

$$A = \tan^{-1} \frac{n}{N} \text{ (in degrees)}$$

where
n=median number of pinion gear teeth
N=given number of ring gear teeth

It is then necessary to calculate the pitch angle y the ring gear from the equation:

$$y = 90° - A$$

where
y=pitch angle of ring gear in degrees
90°=angle in degrees between ring gear and median pinion gear shafts
A=pitch angle of median pinion gear in degrees After determining the ring gear pitch angle for the 90° angle between the pinion and ring gear shafts, one can now determine the angle between the ring gear shaft and each pinion gear selected between and including the lowest and highest number of teeth of the range selected from the equation:

$$x = y - z$$

where
x=angle in degrees between the pinion and ring gear shafts y=ring gear pitch angle determined above for pinion/ring gear shaft angle of 90°

$z$ = pinion gear pitch angle (degrees)

$$= \tan^{-1} \frac{\sin x}{\frac{N}{n} + \cos x} \text{ (degrees)}$$

for shaft angles of less than 90°
(e.g. axis $c_2$ of FIG. 1)
or $$= \frac{\tan^{-1} \sin(180° - x)}{\frac{N}{n} - \cos(180° - x)} \text{ (degrees)}$$

where
N=number of ring gear teeth
n=particular number of pinion gear teeth within range selected for shaft angles of greater than 90° (e.g. axis $c_3$ of FIG. 1)

Once the specific rotational axis angle of each pinion gear from the initial 90° rotational axis of the median pinion gear is determined, the selected pinion gear can be substituted and its journal mountings moved accordingly so that its new central rotational axis is achieved.

By way of example, Table I shows the pinion gear/ring gear shaft angle relationships determined by use of the above equations when the initial number of teeth N, on the ring gear is 43, the range of teeth selected for the pinion gears n=(6−12), the median number n of pinion gear teeth is 9, for which the shaft angle, as previously described, is necessarily 90° and A, the pitch angle of the pinion gear at n=9, is calculated as 78.17851 degrees and y, the pitch angle of the ring gear from $y = 90° - A$, is 11.82149 degrees.

TABLE I

| No. Pinion Gear Teeth | Pinion Gear Ring Gear Shaft Angle (Degrees) | Gear Reduction Ratio |
|---|---|---|
| 6 | 86.02825 | 7.16667 |
| 7 | 87.34699 | 6.14286 |
| 8 | 88.67066 | 5.37500 |
| 9 | 90.00000 | 4.77778 |
| 10 | 91.33585 | 4.30000 |
| 11 | 92.67995 | 3.90909 |
| 12 | 94.03030 | 3.58333 |

Above Table I illustrates that a substantial range of axle differential gear reduction ratios can be obtained by only having to change the number of teeth in the pinion gear and adjust the angular relationship between the ring gear and pinion gear shafts for the particular pinion gear selected within the range under investigation according to the Gleason formulae.

What is claimed is:

1. In a method of providing a motor vehicle axle differential having a pinion gear and a ring gear having a predetermined number of teeth mounted upon respective shafts with variable gear reduction ratios therebetween by adjusting the angular relationship between the ring gear shaft and the pinion gear shaft according to a range of pinion gears having a varying number of teeth, said method including the steps of;

(a) determining the number of teeth desired for the ring gear;
   (b) determining the lowest and highest number of teeth desired for the pinion gear range selected;

(c) determining the median number of pinion gear teeth between the highest and lowest number of teeth determined in step (b);

(d) determining the pitch angle of the pinion gear having the median number of teeth determined in step (c) for a shaft angle of 90° between the ring gear shaft and the pinion gear shaft from the equation:

$$A = \tan^{-1}\frac{n}{N}$$

where:
A = pitch angle of pinion gear in degrees
n = median number of teeth of pinion gear
N = number of ring gear teeth determined in step (a);

(e) determining the pitch angle of the ring gear from the equation:

$$y = 90° - A$$

where:
y = pitch angle of ring gear in degrees
90° = angle between the pinion and ring gear shafts for median pinion gear having median number of teeth;

(f) determining the angle between the pinion gear and ring gear shafts for each pinion gear selected from the highest to the lowest number of teeth determined in step (b) from the equation:

$$x = y - z$$

where
x = angle between the pinion and ring gear shafts
y = ring gear pitch angle in degrees determined in step (e)

$z$ = pinion gear pitch angle whose tangent is
$$\frac{\sin x}{\frac{N}{n} + \cos y}$$
(for shaft angles less than 90°)

or $z$ = pinion gear pitch angle whose tangent is
$$\frac{\sin (180° - x)}{\frac{N}{n} - \cos (180° - x)}$$
(for shaft angles greater than 90°)

where:
N = number of ring gear teeth determined in step (a) above
n = particular pinion gear teeth determined in step (b) above and;

(g) mounting the pinion gear shaft at the angular relationship to the mounted ring gear shaft determined in step (f).

2. A motor vehicle axle differential having an angular relationship between the ring and pinion gear shafts provided by the method of claim 1.

* * * * *